United States Patent
Grobnic et al.

(10) Patent No.: US 11,359,939 B2
(45) Date of Patent: Jun. 14, 2022

(54) LOW INSERTION LOSS HIGH TEMPERATURE STABLE FIBER BRAGG GRATING SENSOR AND METHOD FOR PRODUCING SAME

(71) Applicant: NATIONAL RESEARCH COUNCIL OF CANADA, Ottawa (CA)

(72) Inventors: Dan Grobnic, Ottawa (CA); Stephen Mihailov, Kanata (CA); Robert Walker, Spencerville (CA); Ping Lu, Ottawa (CA); Huimin Ding, Nepean (CA); David Coulas, Ottawa (CA); Cyril Hnatovsky, Ottawa (CA)

(73) Assignee: NATIONAL RESEARCH COUNCIL OF CANADA, Ottawa (CA)

( * ) Notice: Subject to any disclaimer, the term of this patent is extended or adjusted under 35 U.S.C. 154(b) by 0 days.

(21) Appl. No.: 16/952,220

(22) Filed: Nov. 19, 2020

(65) Prior Publication Data

US 2021/0072050 A1   Mar. 11, 2021

Related U.S. Application Data

(63) Continuation of application No. 16/077,781, filed as application No. PCT/IB2017/050882 on Feb. 16, 2017, now Pat. No. 10,866,125.
(Continued)

(51) Int. Cl.
*G01D 5/353* (2006.01)
*G01K 11/3206* (2021.01)
(Continued)

(52) U.S. Cl.
CPC ..... *G01D 5/35316* (2013.01); *G01K 11/3206* (2013.01); *G01L 1/246* (2013.01);
(Continued)

(58) Field of Classification Search
CPC ............ G01D 5/35316; G02B 6/02185; G02B 6/02138; G02B 6/34; G02B 6/124; G02B 6/136; G01K 11/3206; G01L 1/246
See application file for complete search history.

(56) References Cited

U.S. PATENT DOCUMENTS

| 4,807,950 A | 2/1989 | Glenn et al. |
| 4,895,423 A | 1/1990 | Bilodeau et al. |
| (Continued) | | |

FOREIGN PATENT DOCUMENTS

| CA | 2768718 A1 | 2/2011 |
| CN | 102162874 A | 8/2011 |
| (Continued) | | |

OTHER PUBLICATIONS

U.S. Appl. No. 17/133,929, filed Dec. 24, 2020, Phase-Shifted Fiber Bragg Grating Sensor and Method for Producing Same.
(Continued)

*Primary Examiner* — John Bedtelyon
(74) *Attorney, Agent, or Firm* — Perry + Currier Inc.

(57) ABSTRACT

Provided is an optical waveguide with an inscribed Bragg grating, where the Bragg grating is stable at high temperature, has low scattering loss and high reflectivity. Also provided is a method for inscribing a Bragg grating in an optical waveguide, the method comprising irradiating the optical waveguide with electromagnetic radiation from an ultrashort pulse duration laser of sufficient intensity to cause a permanent change in an index of refraction within a core of the optical waveguide, where the irradiating step is terminated prior to erasure of a Bragg resonance, and heating the optical waveguide to a temperature and for a duration sufficient to substantially remove a non-permanent grating formed in the optical waveguide by the irradiating step.

8 Claims, 8 Drawing Sheets

Related U.S. Application Data

(60) Provisional application No. 62/295,772, filed on Feb. 16, 2016.

(51) Int. Cl.
    G01L 1/24     (2006.01)
    G02B 6/02     (2006.01)
    G02B 6/124     (2006.01)
    G02B 6/136     (2006.01)
    G02B 6/34     (2006.01)

(52) U.S. Cl.
    CPC ..... *G02B 6/02138* (2013.01); *G02B 6/02185* (2013.01); *G02B 6/124* (2013.01); *G02B 6/136* (2013.01); *G02B 6/34* (2013.01)

(56) References Cited

U.S. PATENT DOCUMENTS

| | | |
|---|---|---|
| 5,007,705 A | 4/1991 | Morey et al. |
| 5,287,427 A | 2/1994 | Atkins et al. |
| 5,367,588 A | 11/1994 | Hill et al. |
| 5,400,422 A | 3/1995 | Askins et al. |
| 5,771,251 A | 6/1998 | Kringlebotn et al. |
| 5,830,622 A | 11/1998 | Canning et al. |
| 5,861,020 A | 1/1999 | Schwarzmaier |
| 5,976,390 A | 11/1999 | Muramatsu |
| 6,072,926 A | 6/2000 | Cole et al. |
| 6,334,018 B1 | 12/2001 | Fokine |
| 6,888,125 B2 | 5/2005 | Ronnekleiv et al. |
| 6,907,165 B2 | 6/2005 | Liu et al. |
| 6,993,221 B2 | 1/2006 | Mihailov et al. |
| 7,031,571 B2 | 4/2006 | Mihailov et al. |
| 7,033,519 B2 | 4/2006 | Taylor et al. |
| 7,171,093 B2 * | 1/2007 | Kringlebotn .......... C03C 25/104 385/128 |
| 7,323,677 B1 | 1/2008 | Wang |
| 7,483,615 B2 | 1/2009 | Mihailov et al. |
| 7,515,792 B2 | 4/2009 | Mihailov et al. |
| 7,574,075 B2 | 8/2009 | Xia |
| 7,689,087 B2 | 3/2010 | Mihailov et al. |
| 7,835,605 B1 | 11/2010 | Wang et al. |
| 8,272,236 B2 | 9/2012 | Smelser et al. |
| 8,402,789 B2 | 3/2013 | Smelser et al. |
| 8,515,224 B2 | 8/2013 | Vallee et al. |
| 8,727,613 B2 | 5/2014 | Mihailov |
| 8,737,780 B2 | 5/2014 | Vallee et al. |
| 8,849,080 B1 | 9/2014 | Manzur |
| 9,696,476 B1 | 7/2017 | Glebov et al. |
| 10,141,709 B2 | 11/2018 | Ishaaya et al. |
| 10,156,680 B2 | 12/2018 | Grobnic et al. |
| 10,520,669 B2 | 12/2019 | Mihailov et al. |
| 10,551,610 B2 | 2/2020 | Brassard et al. |
| 2004/0184731 A1 | 9/2004 | Mihailov et al. |
| 2004/0184734 A1 | 9/2004 | Mihailov et al. |
| 2004/0258377 A1 | 12/2004 | Berkey et al. |
| 2006/0029322 A1 | 2/2006 | Mihailov et al. |
| 2006/0219676 A1 | 10/2006 | Taylor et al. |
| 2009/0317928 A1 | 12/2009 | Smelser et al. |
| 2012/0039567 A1 | 2/2012 | Herman et al. |
| 2017/0192168 A1 | 7/2017 | Grobnic et al. |
| 2019/0049272 A1 | 2/2019 | Grobnic et al. |

FOREIGN PATENT DOCUMENTS

| | | |
|---|---|---|
| CN | 102576125 A | 7/2012 |
| EP | 2460038 A1 | 6/2012 |
| JP | H1138592 A | 2/1999 |
| JP | 2000134153 A | 5/2000 |
| WO | WO-2011011890 A1 | 2/2011 |
| WO | WO-2015154177 A1 | 10/2015 |
| WO | WO-2017141188 A1 | 8/2017 |
| WO | PCT/IB2019/055099 | 6/2019 |
| WO | PCT/IB2020/061551 | 12/2020 |

OTHER PUBLICATIONS

Thomas, Jens, et al. "Cladding mode coupling in highly localized fiber Bragg gratings: modal properties and transmission spectra." Optics express 19.1 (2011): 325-341.

Grobnic, Dan, et al. "Growth dynamics of type II gratings made with ultrafast radiation." Optical Sensors. Optical Society of America, 2014.

Walker, Robert B., et al. "Entrained-flow gasifier and fluidized-bed combustor temperature monitoring using arrays of fs-IR written fiber Bragg gratings." 24th International Conference on Optical Fibre Sensors. vol. 9634. International Society for Optics and Photonics, 2015.

Riant, Isabelle et al. "Study of the photosensitivity at 193 nm and comparison with photosensitivity at 240 nm influence of fiber tension: type IIa aging." Journal of lightwave technology 15.8 (1997): 1464-1469.

Mihailov, Stephen J., et al. "Bragg grating inscription in various optical fibers with femtosecond infrared lasers and a phase mask." Optical Materials Express 1.4 (2011): 754-765.

Li, Yuhua, et al. "Fiber Bragg gratings with enhanced thermal stability by residual stress relaxation." Optics express 17.22 (2009): 19785-19790.

Chen, Kevin P., et al. "Self-heated fiber Bragg grating sensors." Applied Physics Letters 86.14 (2005): 143502.

Cavillon, Maxime, et al. "Overview of high temperature fibre Bragg gratings and potential improvement using highly doped aluminosilicate glass optical fibres." Journal of Physics: Photonics 1.4 (2019): 042001.

Bernier, M., et al. "Ytterbium fiber laser based on first-order fiber Bragg gratings written with 400nm femtosecond pulses and a phase-mask." Optics express 17.21 (2009): 18887-18893.

Smelser, Christopher W. et al. "Formation of Type I-IR and Type II-IR gratings with an ultrafast IR laser and a phase mask." Optics express 13.14 (2005): 5377-5386.

Martinez, Ams, et al. "Direct writing of fibre Bragg gratings by femtosecond laser." Electronics Letters 40.19 (2004): 1170-1172.

Allsop, T., et al. "Refractive index sensing with long-period grating fabricated in biconical tapered fibre." Electronics letters 41.8 (2005): 471-472.

Beresna, M. et al., "Polarization sensitive elements fabricated by femtosecond laser nanostructuring of glass." Optical Materials Express 1.4 (2011): 783-795.

Bernier, Martin, et al. "All-fiber DFB laser operating at 2.8 μm." Optics letters 40.1 (2015): 81-84.

Du, Yong, et al. "Fabrication of phase-shifted fiber Bragg grating by femtosecond laser shield method." IEEE Photonics Technology Letters 29.24 (2017): 2143-2146.

Grobnic, D., et al. "Bragg grating evanescent field sensor made in biconical tapered fiber with femtosecond IR radiation." IEEE Photonics Technology Letters 18.1 (2006): 160-162.

He, Jun, et al. "Highly birefringent phase-shifted fiber Bragg gratings inscribed with femtosecond laser." Optics letters 40.9 (2015): 2008-2011.

Hnatovsky, Cyril, et al., "Nonlinear photoluminescence imaging applied to femtosecond laser manufacturing of fiber Bragg gratings." Optics express 25.13 (2017): 14247-14259.

Hnatovsky, Cyril, et al. "Self-organized nanostructure formation during femtosecond-laser inscription of fiber Bragg gratings." Optics letters 42.3 (2017): 399-402.

Hoo, Yeuk L., et al. "Design and modeling of a photonic crystal fiber gas sensor." Applied Optics 42.18 (2003): 3509-3515.

Iadicicco, Agostino, et al. "Thinned fiber Bragg gratings as high sensitivity refractive index sensor." IEEE Photonics Technology Letters 16.4 (2004): 1149-1151.

Kashyap, R. et al., "UV written reflection grating structures in photosensitive optical fibres using phase-shifted phase masks." Electronics Letters 30.23 (1994): 1977-1978.

Keren, S. et al., "Distributed three-dimensional fiber Bragg grating refractometer for biochemical sensing." Optics letters 28.21 (2003): 2037-2039.

(56) References Cited

OTHER PUBLICATIONS

Loh, W. H. et al., "1.55 µm phase-shifted distributed feedback fibre laser." Electronics Letters 31.17 (1995): 1440-1442.
Love, J. D., et al. "Tapered single-mode fibres and devices. Part 1: Adiabaticity criteria." IEE Proceedings J (Optoelectronics) 138.5 (1991): 343-354.
Marshall, Graham D., et al. "Point-by-point written fiber-Bragg gratings and their application in complex grating designs." Optics express 18.19 (2010): 19844-19859.
Schroeder, Kerstin, et al. "A fibre Bragg grating refractometer." Measurement Science and Technology 12.7 (2001): 757-764.
Sheng, Yunlong et al., "Near-field diffraction of irregular phase gratings with multiple phase-shifts." Optics express 13.16 (2005): 6111-6116.
Silva, Susana, et al. "H 2 sensing based on a Pd-coated tapered-FBG fabricated by DUV femtosecond laser technique." IEEE photonics technology letters 25.4 (2013): 401-403.
Tremblay, Guillaume et al., "Effects of the phase shift split on phase-shifted fiber Bragg gratings." Journal of the Optical Society of America B Optical Physics 23.8 (2006): 1511-1516.
Villatoro, J. et al., "High resolution refractive index sensing with cladded multimode tapered optical fibre." Electronics letters 40.2 (2004): 106-107.
Wu, Qi et al., "High-sensitivity ultrasonic phase-shifted fiber Bragg grating balanced sensing system." Optics express 20.27 (2012): 28353-28362.
PCT/IB2020/061551, Low Scattering Loss High Temperature Stable Fiber Bragg Grating Sensor Based on Micropore Formation and Method for Producing Same, filed Dec. 4, 2020.
PCT/IB2019/055099, Phase-Shifted Fiber Bragg Grating Sensor and Method for Producing Same, filed Jun. 18, 2019.
U.S. Appl. No. 17/133,929, Phase-Shifted Fiber Bragg Grating Sensor and Method for Producing Same, filed Dec. 24, 2020.
Mihailov, Stephen J. "Chapter 6: Femtosecond laser-inscribed fiber Bragg gratings for sensing applications." Opto-Mechanical Fiber Optic Sensors. Butterworth-Heinemann, 2018. 137-174.
Li, Hongpu, et al. "Optimization of a continuous phase-only sampling for high channel-count fiber Bragg gratings." Optics Express 14.8 (2006): 3152-3160.
Swanton, A., et al. "Use of e-beam written, reactive ion etched, phase masks for the generation of novel photorefractive fibre gratings." Microelectronic engineering 30.1-4 (1996): 509-512.
Dostovalov, A. V., et al. "Point-by-point inscription of phase-shifted fiber Bragg gratings by femtosecond IR radiation in passive and active rare-earth doped optical fibers." 2017 Progress in Electromagnetics Research Symposium-Spring (PIERS). IEEE, 2017.

\* cited by examiner

LOW INSERTION LOSS HIGH TEMPERATURE STABLE FIBER BRAGG GRATING SENSOR AND METHOD FOR PRODUCING SAME

CROSS-REFERENCE TO RELATED APPLICATION

This application is a continuation of a co-pending U.S. application Ser. No. 16/077,781, filed Aug. 14, 2018, which is incorporated herein by reference in its entirety.

FIELD OF THE INVENTION

The present invention relates to methods for the formation of fiber Bragg gratings in optical waveguides and to sensing apparatus comprising such gratings. Such sensors can be used for measurement of pressure, strain, temperature, or displacement or index of refraction at a high temperature, for example up to 1000° C.

BACKGROUND OF THE INVENTION

Fiber Bragg grating (FBG) sensors are attractive devices for performing quasi-distributed temperature and strain measurements along an optical waveguide (e.g. optical fiber). Variations in the spectral response of the grating result from period changes in the Bragg grating due to strains or temperature variations that are experienced by the optical fiber when placed in a specific environment. These FBG sensors offer important advantages over other sensor technologies because of their electrically passive operation, electromagnetic interference (EMI) immunity, high sensitivity and multiplexing capabilities. Fiber Bragg gratings are simple, intrinsic sensing elements which traditionally have been UV photo-inscribed into photosensitive Ge-doped silica fiber. Each FBG sensor has a characteristic retro-reflective Bragg resonance or Bragg resonance wavelength, which is dependent upon the periodicity of the grating photo-inscribed within the fiber and the effective refractive index $n_{eff}$, of the fundamental core mode of the optical fiber. The FBG sensors can then easily be multiplexed in a serial fashion along a length of single fiber to produce a quasi-distributed optical fiber sensor array. When embedded into composite materials, optical fibers with an array of FBG sensors allow for distributed measurements of load, strain, temperature and vibration of the material creating what has is commonly referred to as "smart structures" where the health and integrity of the structure is monitored on a real-time basis.

Typically, fiber Bragg gratings are generated by exposing the UV-photosensitive core of a germanium doped silica core optical fiber to a spatially modulated UV laser beam in order to create permanent refractive index changes in the fiber core. Such a spatially modulated UV beam can be created by using a two-beam interference technique as disclosed in U.S. Pat. No. 4,807,950 by Glenn et al. or by using a phase mask as disclosed in U.S. Pat. No. 5,367,588 by Hill et al. The techniques taught by Glenn and Hill result in gratings that are typically referred to as Type I gratings.

A limitation of the prior-art UV-induced Type I fiber Bragg gratings, especially for high temperature sensor applications, is that operation of the sensor at elevated temperatures results in the removal or annealing of the UV-induced color centers and densification which are responsible for the induced index change of the grating. In fact, at temperatures approaching the glass transition temperature of the fiber, which for silica is approximately 1000° C., total removal of the induced index modulation results.

Another method for creating permanent photoretractive index changes in glasses employs the use of intense UV beams with fluences or energy/unit-area per laser pulse densities that approach those required to produce macroscopic damage of the glass. Askins et al. in U.S. Pat. No. 5,400,422 teach a method for producing permanent photoretractive index changes in the photosensitive cores of Ge-doped optical fibers with a single high intensity UV laser pulse. Such Bragg gratings resulting from macroscopic damage to the glass optical fiber are typically referred to as Type II gratings. The high intensity portions of the interference fringes created by two crossed UV beams split from a single UV beam create localized damage at the core-cladding interface within the fiber. Because the process for inducing index change is one of structural change due to localized photo-ionization and physical damage to the glass, rather than due to UV photo induced color center defect formation, the induced index change is more robust and does not decrease with elevated temperature. In fact Askins et al. disclose that gratings produced in this way cannot be removed by annealing until the fiber or waveguide approaches the material's glass transition temperature. The drawback of this approach for induction of index change is that the Bragg gratings produced in this fashion have relatively low refractive index modulations ($\Delta n=10^{-4}$) and are mechanically weak since the effective refractive index change results from periodic localized damage at the core-cladding interface. When the pulse duration is long (>a few tens of picoseconds) laser-excited electrons can transfer energy to the surrounding lattice faster than the thermal diffusion of the material can remove the energy resulting in damage.

If the laser pulse continues to feed energy into the damage site, the damage can propagate beyond the irradiated zone. For damage grating structures written with long laser pulse durations greater than a few tens of picoseconds, the spectral quality of the resulting Bragg grating is often poor and there is often high scattering loss of the probe signal within the fiber.

Another method for creating permanent photoretractive index changes in optical fiber employs the use of the process of "hydrogen-loading," as taught by Atkins et al. in U.S. Pat. No. 5,287,427, combined with UV-laser exposure of optical fiber to produce a type I grating that is manufactured within a core that is co-doped with fluorine. Subsequent to the UV exposure the fiber then undergoes a thermal post treatment at 1000° C. in order to induce a chemical composition grating as taught by Fokine in U.S. Pat. No. 6,334,018. These gratings have often been referred to in the literature as thermally regenerated gratings. As with the technique taught by Askins et al., the technique taught by Fokine also has the drawback that the induced index change of the Bragg gratings produced in this fashion have relatively low refractive index modulations ($\Delta n=10^{4}$).

By using special optical fibers such as silica based optical fibers but with very high germanium concentrations in the core, Riant et al. in *J. Lightwave Technol.* 15 (8), 1464 (1997) demonstrate that a sustained exposure to an interference pattern created with pulsed UV laser light will initially produce a Type I Bragg grating which will erase and then subsequently regrow but at shorter wavelength of the Bragg resonance. This type of grating was found to have better thermal stability at 400° C. than a Type I grating and was dubbed a "Type IIA" grating. The formation of the Type IIA grating is the result of relaxation by the laser beam of high internal stresses present in the fiber due to the dissimilarities of the fiber core and cladding materials. The resulting grating has a negative index change compared to the original Type I writing. The limitation in this approach to writing thermally stable gratings is that the grating structure erases at temperatures approaching 600° C. and it is limited to optical fibers possessing high internal stresses.

Another method for creating UV laser-induced gratings with higher thermal stability than Type I fiber Bragg gratings is taught by Liu et al. in U.S. Pat. No. 6,907,165 where sustained exposure of a hydrogen-loaded Boron-Germanium co-doped optical fiber to a UV laser induced interference pattern results in the formation of a Type I grating, its subsequent removal and then the formation of what is called a Type IA grating with better thermal properties. As in the approach demonstrated by Riant et al. for Type IIA gratings, sustained exposure to the UV laser beam results in Type I grating formation, its removal and the formation of another grating with better thermal stability but this time the result of positive index change. As with the case of Type IIA gratings, this approach requires specialty optical fibers as well as hydrogen loading. Furthermore the induced index change is annealed out at temperatures above 500° C.

The fabrication of high temperature stable Bragg gratings using infrared ultrafast radiation and a phase mask, as taught by Mihailov et al in U.S. Pat. No. 6,993,221 results in high temperature stable Bragg gratings with very high index modulations ($\Delta n > 10^{-3}$). For Ge-doped silica optical fibers, Smelser et al. showed in *Opt. Express.*, vol. 13, pp. 5377-5386, 2005, that these high temperature stable Bragg gratings are formed as a result of traversing an intensity threshold $I_{t}h$. When using multiple irradiating femtosecond infrared (fs-IR) laser 10 pulses with beam intensifies greater than $I_{th}=4 \times 10^{13}$ W/cm$^2$ at the surface of the optical fiber, the formation of thermally stable Bragg gratings similar to Type II UV-induced gratings was observed. In the case of gratings fabricated using the techniques taught in U.S. Pat. No. 6,993,221, the index modulation results from a threshold type process of multiphoton absorption and multiphoton ionization that results in plasma formation and the possible creation of microvoids. Although strong gratings can be formed using the approach taught in U.S. Pat. No. 6,993, 221, the resulting Type II gratings suffer from high scattering loss making it difficult to concatenate a large number of Bragg grating sensors into a sensor array on a single length of optical fiber. The threshold nature of the process also makes it more difficult to tailor the induced index profile of the grating in terms of its apodization, reflectivity and reflection bandwidth. Using the technique taught by Mihailov et al in U.S. Pat. No. 7,031,571, Smelser et al. also showed that very high index modulations ($\Delta n > 10^{-3}$) could be created with laser beam intensities lower than $I_{th}=4 \times 10^{13}$ W/cm$^2$ that did not possess high scattering loss. However, these gratings were not high temperature stable, and the index modulation, likely arising from color center formation and material densification, was erased at temperatures>800° C. These gratings were referred to as Type I fiber Bragg gratings.

Induction of Bragg gratings using femtosecond infrared radiation pulse intensity thresholds below the $I_{th}$ for Type II fiber Bragg grating formation but with extremely large index modulations ($\Delta n > 3 \times 10^{-3}$) as taught by Smelser et al. in U.S. Pat. No. 8,272,236 result in a portion of the refractive index change which is stable at temperatures approaching 1000° C. For this process, the Bragg gratings are formed by using sustained laser exposures consistent with a Type I grating formation and the optical fiber photosensitization processes to infrared radiation taught by Mihailov et al. in U.S. Pat. No. 7,515,792 in Ge-doped hydrogen loaded optical fiber. Beneficially, the resulting fiber Bragg gratings have a portion of their index modulation that is thermally stable at 1000° C. but also have low insertion loss or scattering loss. Serious limitations to this approach exist because of the requirement for prolonged laser exposures which introduces wear and tear on the inscription laser as well as reduced reliability of the optical fiber. The extra processing step of photosensitization can only be applied to Ge-doped fiber and is ineffective for other silica based optical fibers absent a Ge-dopant.

The limitation for the necessity of the use of hydrogen loading of Ge-doped fiber is removed in the process taught by Smelser et al. in U.S. Pat. No. 8,402,789 where a Type I grating is initially written using multiple laser pulses at intensities below the threshold intensity for Type II grating formation. This pre-conditioning of the optical fiber has the effect of lowering the $I_{th}$ for type II grating formation by 25%. By lowering the threshold for multiple pulse type II grating formation and using lower grating inscription laser intensities, lower loss thermally stable type II gratings are realized.

There still remains in this field of art the need for Fiber Bragg grating sensors that are thermally stable, that have good reflectivity, and that experience low scattering loss to permit multiplexing of multiple FBG sensors along a single optical waveguide.

SUMMARY OF THE INVENTION

In one aspect, there is provided a method for inscribing a Bragg grating in an optical waveguide, comprising the steps of: providing the optical waveguide; providing electromagnetic radiation from an ultrashort pulse duration laser, wherein the electromagnetic radiation has a pulse duration of less than or equal to 5 picoseconds, and wherein the wavelength of the electromagnetic radiation has a characteristic wavelength in the wavelength range from 150 nm to 2.0 microns; irradiating the optical waveguide with the electromagnetic radiation to form a Bragg grating, the electromagnetic radiation incident on the optical waveguide being sufficiently intense to cause a permanent change in an index of refraction within a core of the optical waveguide when exposed to a succession of laser pulses, wherein the irradiating step is carried out for at least a number of pulses sufficient to form the permanent index of refraction change in the core of the optical waveguide, and wherein the irradiating step is terminated prior to erasure of a Bragg resonance (Bragg resonance erasure, or Bragg resonance minimum, as defined below) by the irradiating; and heating the optical waveguide to a temperature and for a duration sufficient to substantially remove a non-permanent grating formed in the optical waveguide by the irradiating step. In one embodiment, the method further comprises a step of: providing a diffractive optical element which, when exposed to the ultrashort laser pulse, creates an interference pattern on the optical waveguide, wherein the irradiation step comprises irradiating a surface of the diffractive optical element with the electromagnetic radiation, the electromagnetic radiation incident on the optical waveguide, from the diffractive optical element, being sufficiently intense to cause the permanent change in index of refraction in the core of the optical waveguide.

In another aspect, there is provided an optical waveguide with an inscribed Bragg grating prepared according to the method as described herein.

In still another aspect, there is provided an optical waveguide with an inscribed Bragg grating, wherein: the Bragg grating is stable at a temperature up to the glass transition temperature of the optical waveguide; and the Bragg grating has a scattering loss of less than 3.0 dB and a reflectivity greater than 10%.

In the present application, references to "a permanent change in an index of refraction within a core of the optical waveguide" represents the formation of a grating that is stable at higher temperatures, for example at a temperature up to just below the glass transition temperature of the material forming the optical waveguide being inscribed with the grating. This is also referred to herein and in the art as a type II grating. In one embodiment, where the waveguide is a silica based fiber, a permanent change in an index of refraction within a core of the optical waveguide is one which is stable at temperatures of up to 1000° C. In other embodiments, where the optical waveguide comprises a different material (e.g. crystalline sapphire), the temperature may be higher than 1000° C.

In the present application, references to a "non-permanent grating" refer to gratings that are not stable to high temperatures, and that can be substantially removed by heating the optical waveguide. These are also referred to herein and in this field of art as type I gratings. In one embodiment, a non-permanent grating is one which is substantially removed by heating at temperatures of up to 1000° C. In some embodiments, the non-permanent gratings are substantially erased at temperatures lower than 1000° C., for example 800° C.

DESCRIPTION OF THE DRAWINGS

Exemplary embodiments of the invention will now be shown in conjunction with the drawings in which.

(301): a Type I grating written with intensities below $I_{th}$, and (302): a grating written with intensities above $I_{th}$ and but with an insufficient number of pulses to reach the Bragg resonance wavelength erasure (i.e. irradiation was terminated during Region 202 as observed in FIG. 2).

Figure 4:
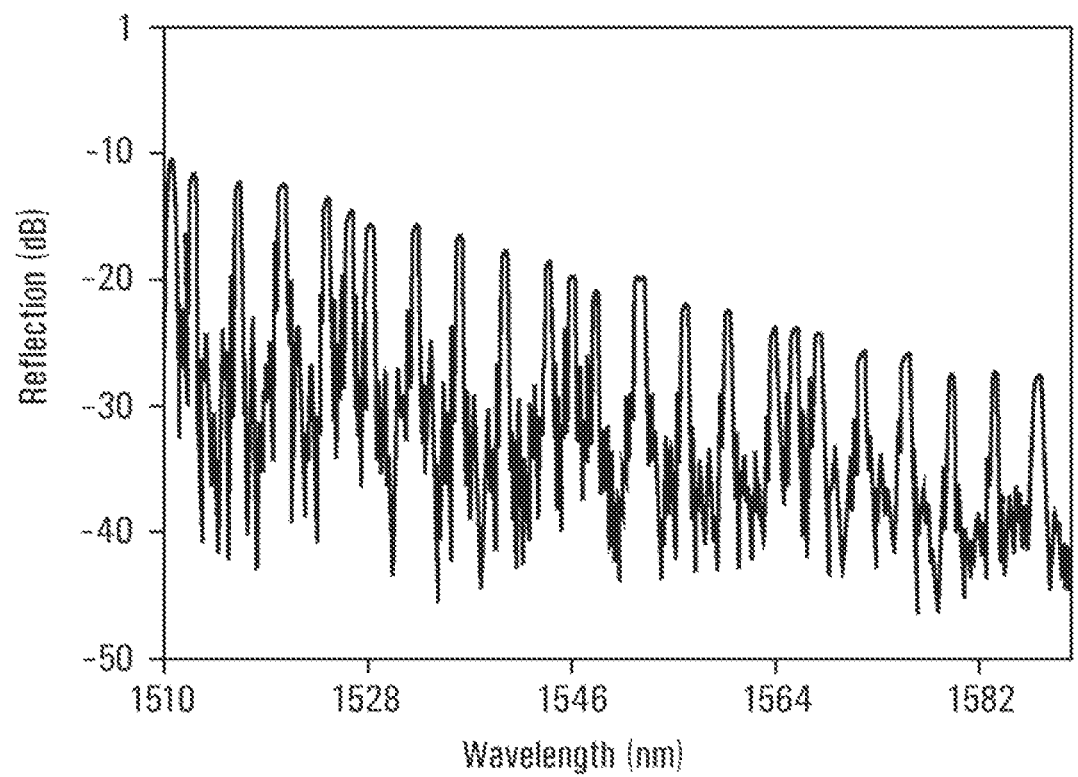

FIG. 4 displays the reflectivity spectra of an array inscribed with 24 strong type II Bragg gratings having a loss per grating between 0.5 dB and 1 dB.

Figure 5A:
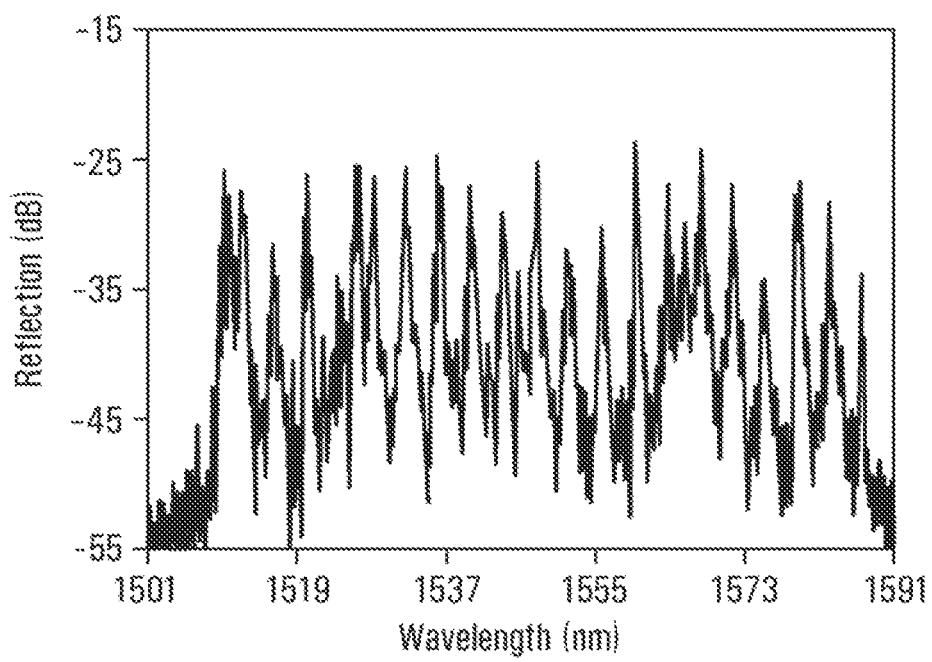
Figure 5B:
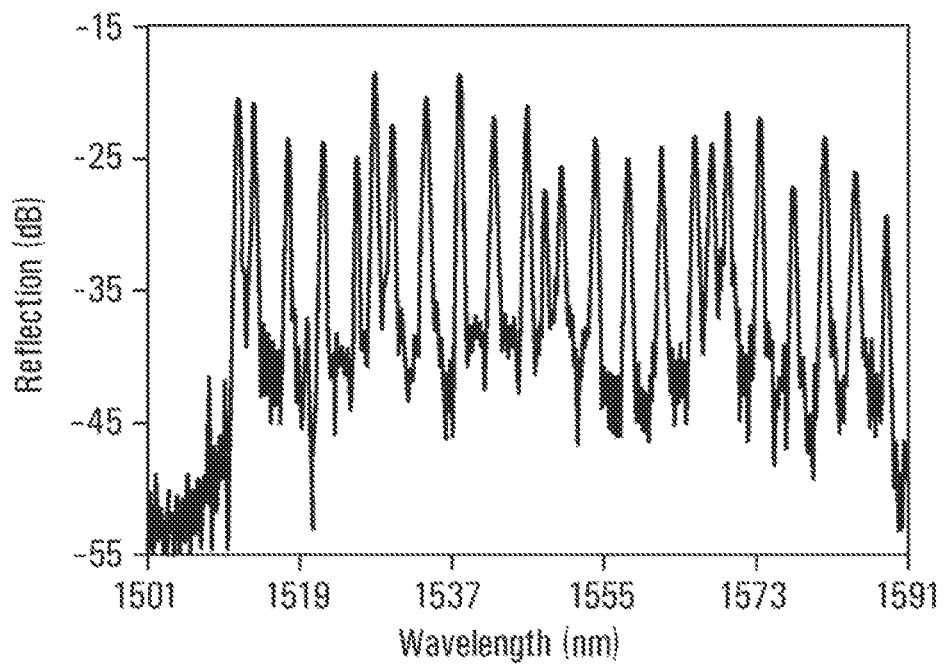

FIGS. 5A and 5B respectively display the pre-annealing and post-annealing room temperature reflection spectra of an array inscribed with 24 type II Bragg gratings, where the inscription was terminated prior to reaching the Bragg resonance erasure.

Figure 6A:
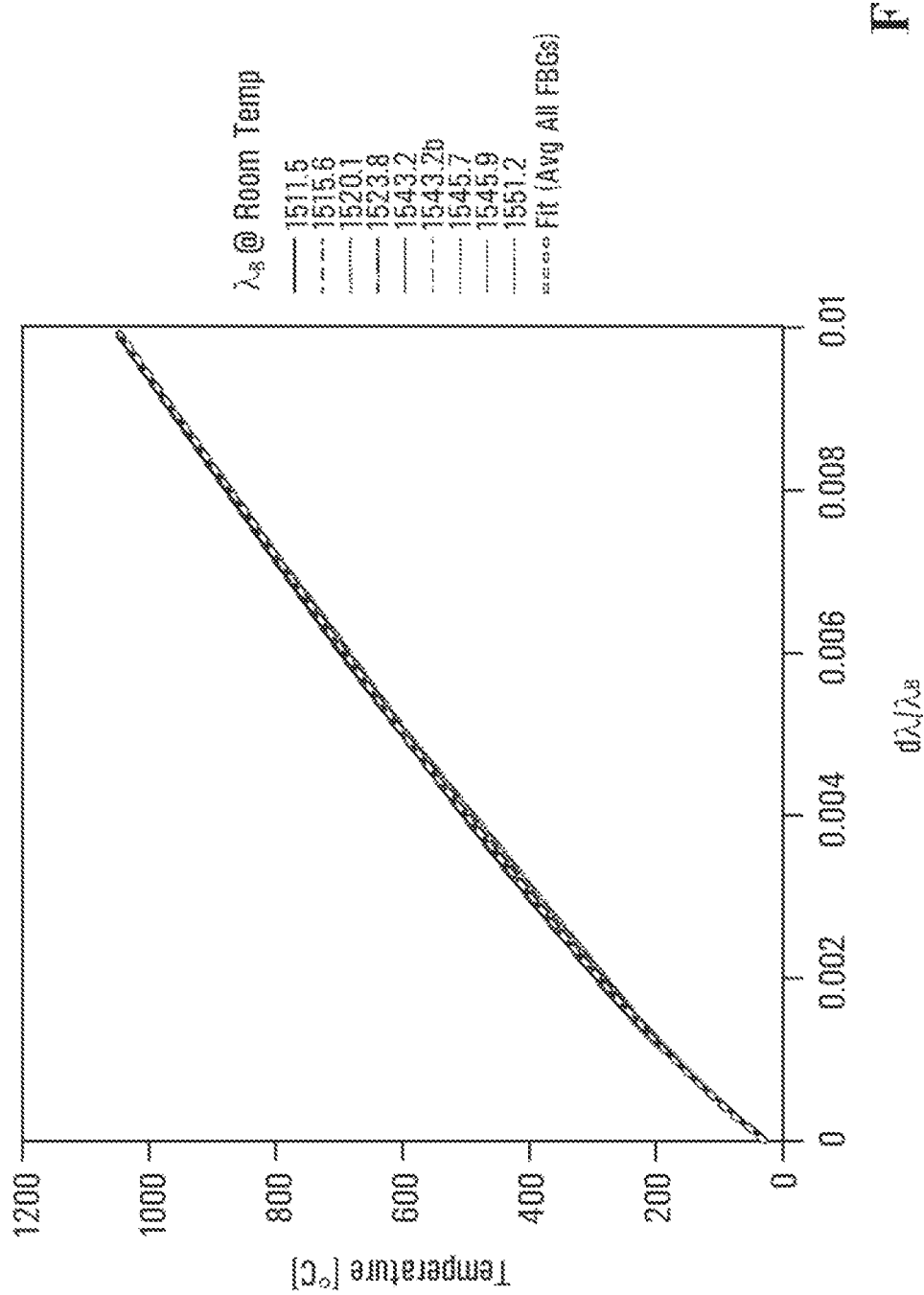
Figure 6B:
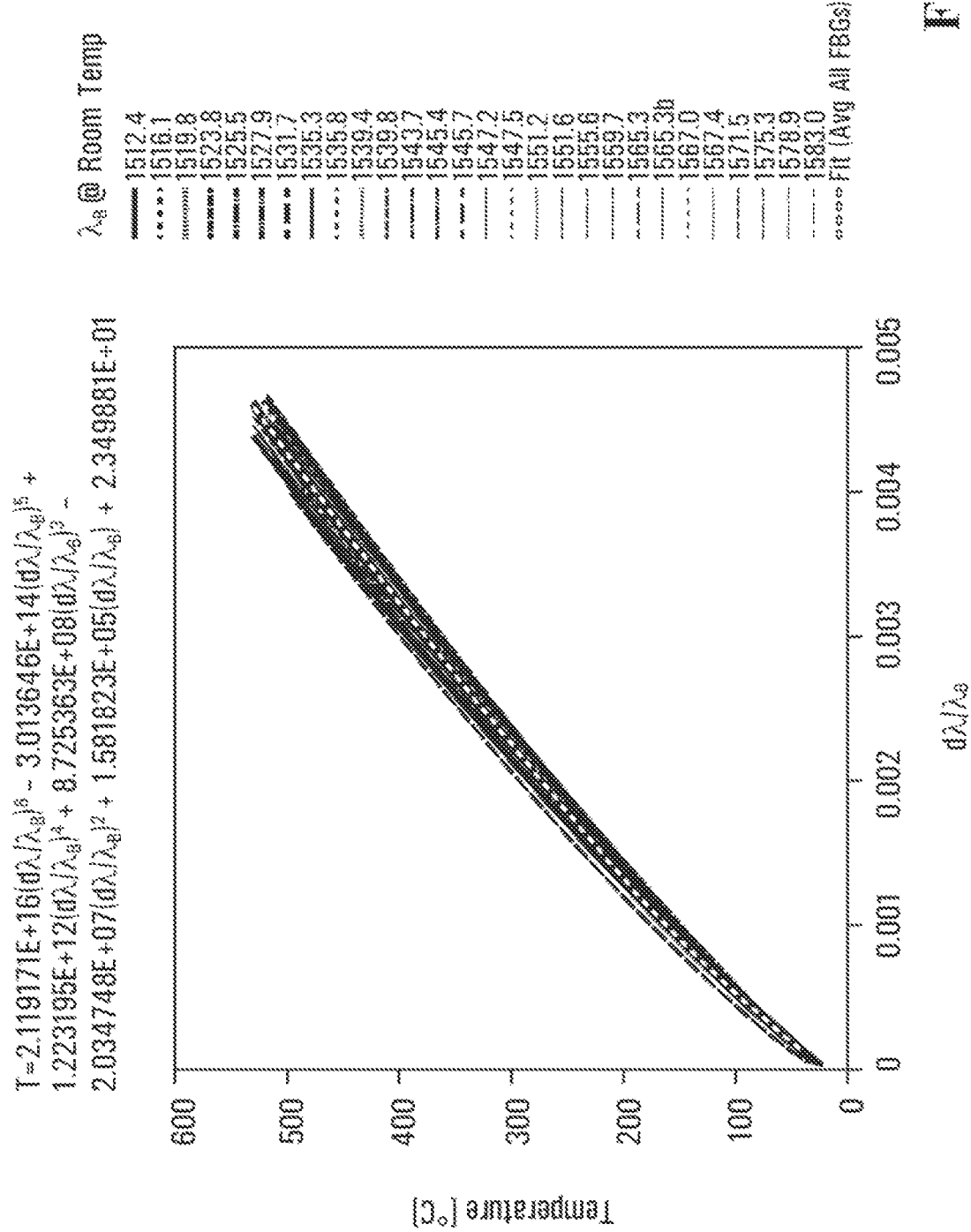

FIG. 6A plots the average fit for each of the 9 devices temperature cycled as described in Example 6, as well as the overall average fit. FIG. 6B plots the comparative results previously reported in the art.

Figure 2:
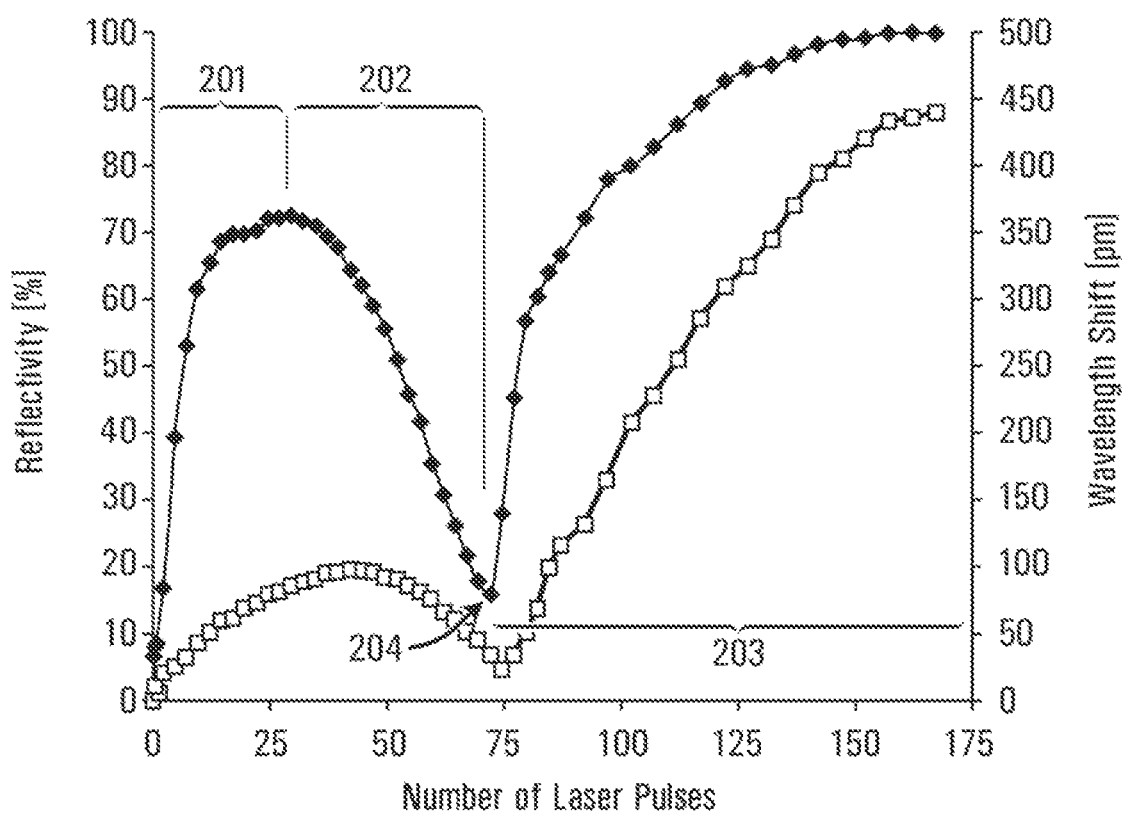
FIG. 2 shows the evolution in reflected Bragg resonance signal as a function of exposure (number of laser pulses) measured with a Bragg grating interrogator that monitors the strength of the reflected Bragg resonance light. The top evolution trace shows a sequential signal growth, reduction, and regrowth at the Bragg resonance wavelength (at around 1544 nm for the selected optical waveguide). Region 201 denotes the growth of the signal amplitude, associated with Type I grating formation. Region 202 denotes the reduction of signal amplitude, associated with Type II grating formation, towards the minimum in Bragg resonance amplitude (204), which is the point of Bragg resonance erasure. Region 203 shows the re-growth in signal strength, following the Bragg resonance minimum, associated with the further formation of Type II grating. The bottom evolution trace denotes the wavelength shift of the Bragg resonance as a function of the number of pulses.
Figure 7:
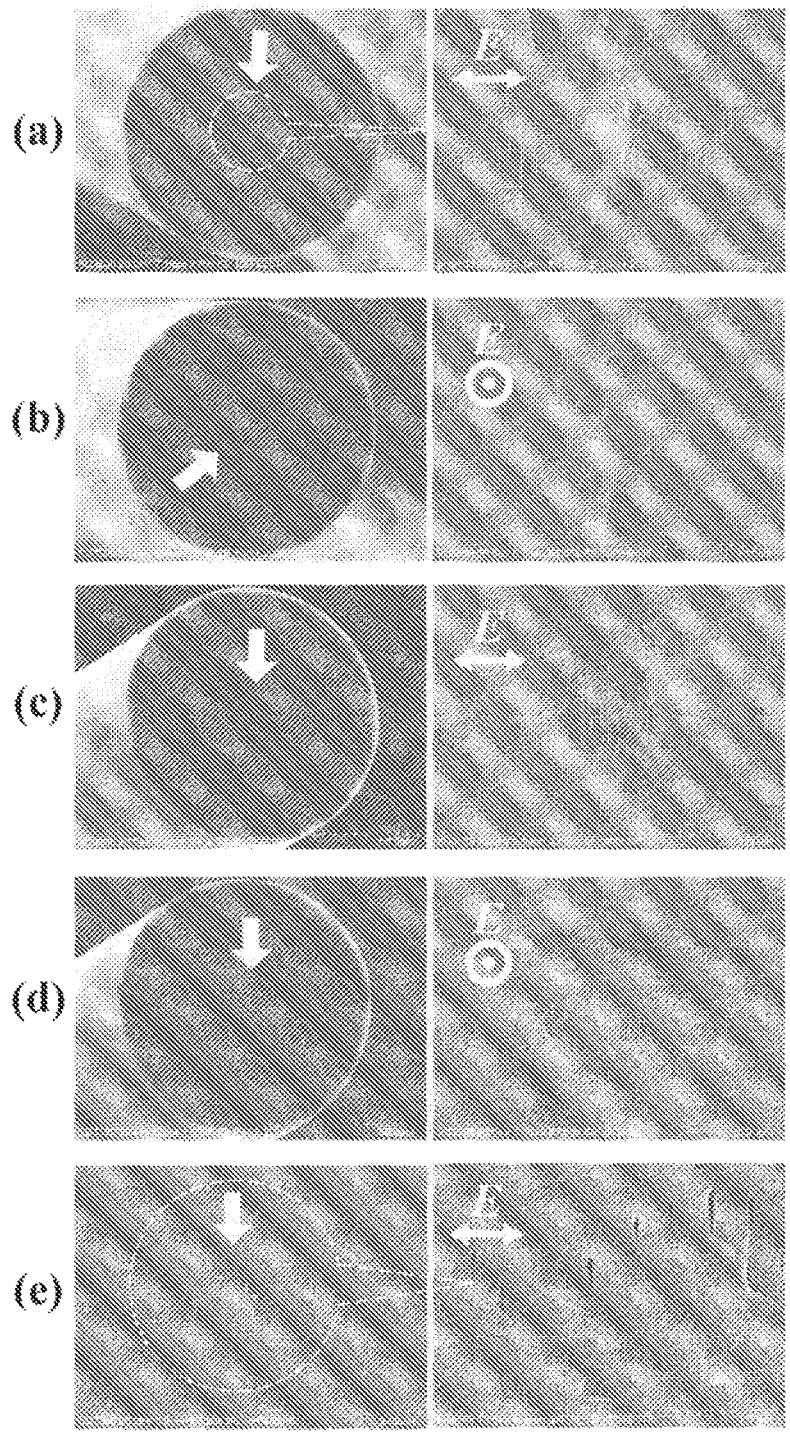

FIG. 7 presents scanning electron micrographs (SEM) showing the formation of form birefringent nanogratings within the fiber Bragg grating created within Region 203 of FIG. 2. The arrows in the left column indicate the beam propagation direction for each case. The respective zoom-in images in the right column are all oriented vertically by adjusting the SEM scan rotation.

DETAILED DESCRIPTION OF THE INVENTION

It is an object of this invention to provide for fabrication of high temperature stable FBG sensors by using limited numbers of short electromagnetic pulses, the intensity of the electromagnetic pulses being such that the intensity at the core of optical fibers is greater than $I_{th}$. These pulses create, together with a thermal post processing, a Type II grating structure that does not suffer from high scattering loss and that is stable up to close to the glass transition temperature of the fiber being inscribed.

In some embodiments, the pulses are transmitted through an optical diffraction element, e.g. a phase mask, so as to create an interference field that will interact with optical waveguide or fiber (e.g. silica-based fiber) to create the Bragg grating pattern. These embodiments are described in greater detail below. However, any other process which also involves using ultrafast pulsed laser radiation that results in the creation of a grating structure, such as the 'point-by-point' technique disclosed by Martinez et al. in Electron. Lett. 40 (19), p. 1170 (2004), can be tailored to follow the same steps as described below and can be used to create low loss Type II gratings.

Scattering loss (or insertion loss) in fiber refers to loss or attenuation of signal due to microscopic variations in the material density, compositional fluctuations, structural inhomogeneities and manufacturing defects. In this instance scattering loss refers to these qualities as they relate to a Bragg grating. In some embodiments, scattering loss may be observed by reduced reflectivity signal amplitude for consecutive Fiber Bragg gratings along an array of gratings.

In Grobnic et al., "Growth Dynamics of Type II Gratings Made with Ultrafast Radiation," presented at the OSA Advanced Photonics Congress Bragg Gratings, Photosensitivity, and Poling in Glass Waveguides (BGPP) meeting; 2014, July 27-31, Barcelona, Spain; it was disclosed that when using single pulses of fs-IR radiation through a diffractive optical element (e.g. a phase mask) in sequence with intensities at the fiber surface that are above the $I_{th}$ for Type II induced index change, the initial laser pulses form a structure that is like a Type I grating. Continued exposure to subsequent fs-IR pulses through the phase mask results in growth and then erasure of the Type I grating. After the erasure of the Type I grating, continued exposure results in appearance and then growth to saturation of a thermally stable Type II grating having the same Bragg resonance wavelength as the initial type I grating.

It has now been discovered that if irradiation of the optical waveguide is terminated after formation of a type II grating but prior to the Bragg resonance wavelength erasure, and that the optical waveguide is subsequently heated to remove the type I gratings formed, the resulting waveguide comprises a thermally stable type II grating having a very low insertion loss.

Figure 1:
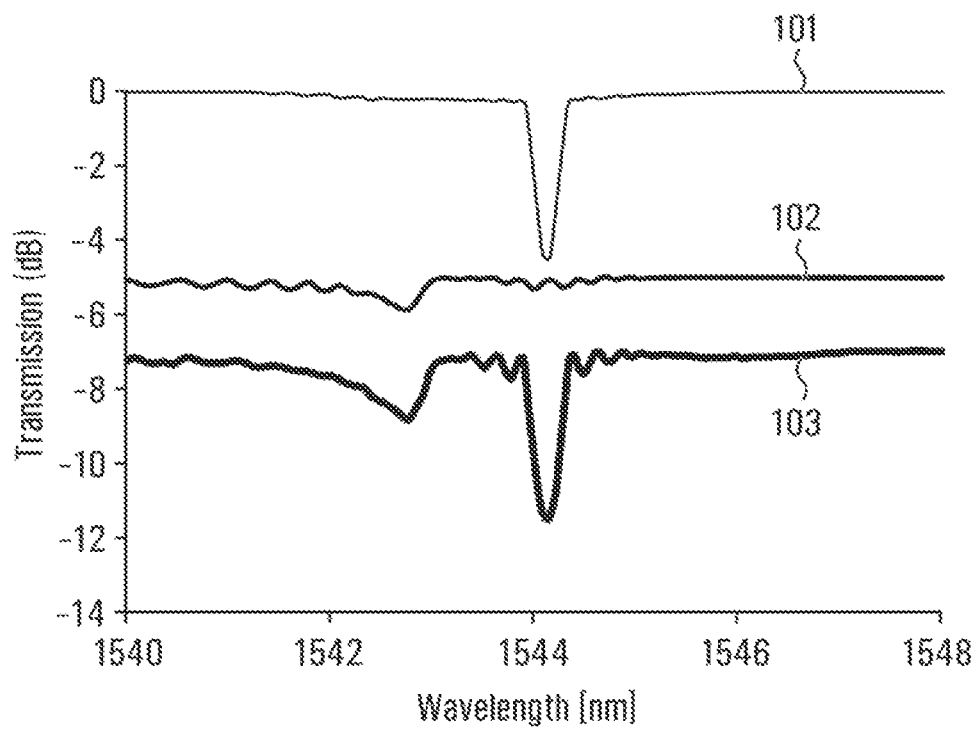
FIG. 1 shows the evolution of the transmission spectra of a grating as it is being written by sequential pulses of high intensity 800 nm radiation that are passed through a phase mask. Trace 101 represents the signal amplitude observed after initial pulses, associated with Type I grating formation, Trace 102 represents the reduction of signal amplitude observed after a number of further pulses (the Bragg resonance wavelength erasure), and Trace 103 represents the signal amplitude observed after irradiation past the Bragg resonance wavelength erasure, associated with further formation of Type II grating.

Complex dynamics have been observed in the process of generating a Type II grating using the high repetition rate infrared ultrafast radiation and the phase mask method. When using repetition rates>10 Hz and intensities>$I_{th}$ for Type II grating formation for a given pulse duration and after a short incubation period of successive laser pulse accumulation, Type II grating growth occurs very rapidly creating a high reflectivity structure after only a few dozen laser pulses. If however the speed of the process is reduced by using lower intensity pulses but still above $I_{th}$ and a low repetition rate, evolution of the grating reflectivity at the Bragg resonance was observed to occur in three well-defined stages. These are shown in FIG. 1. Trace 101 shows an initial grating growth similar to regular Type I growth up to 90% reflectivity (as measured by transmission (dB), with low insertion loss and no cladding mode coupling. Trace 102 shows the erasure of the first Bragg resonance and the apparition of cladding mode coupling (just below 1543 nm), the latter being indicative of the presence of type II gratings (as taught, e.g., by Thomas et al., Cladding mode coupling in highly localized fiber Bragg gratings: modal properties and transmission spectra, Opt. Express 19, 325-341 (2011)). Trace 103 shows the re-emergence of the reflectivity at the Bragg resonance, together with large cladding mode coupling. The three traces in FIG. 1 are offset for clarity, and are not indicative of the overall loss of each grating (e.g. Trace 103 does not have an average insertion loss of −7 dB).

Shown in FIG. 2 is the full evolution of the reflectivity at the Bragg resonance wavelength, where stage 201 depicts the initial increase in reflectivity, the following decay in reflectivity (202), and the subsequent return of reflectivity (203).

Without wishing to be bound by theory, it is believed that upon irradiation using lower intensity pulses that are still above $I_{th}$ and using a low repetition rate, type I Bragg gratings are initially inscribed in the waveguide, and that these are responsible for the initial increase in reflectivity. This is supported by the lack of cladding mode resonance in the initial transmission measurement. However, type II gratings are also believed to be inscribed, albeit at a slower rate. The reduction in signal amplitude may be due to cancellation of the signal produced by the different types of gratings, or by the formation of the type II gratings interfering or destroying the earlier formed type I gratings. The point at which reflectivity of the system during irradiation reaches a minimum is referred to herein as the Bragg resonance erasure (alternatively referred herein as the Bragg resonance wavelength erasure, or the Bragg resonance minimum). Following this point, it is believed that formation of type II Bragg gratings continues, increasing reflectivity at the Bragg resonance wavelength. Thus, what is being observed is believed to be the result of simultaneous induction of both Type I and Type II index change, with continued exposure resulting in the dominance of the type II index change.

It has now been discovered that if the grating evolution (i.e. irradiation) is terminated during the second exposure stage, i.e. after the inscription of type II gratings has begun and before the Bragg resonance erasure (e.g. during zone 202 in FIG. 2), and if the waveguide is then heated such that non-permanent (type I) gratings formed are erased, the process results in an optical waveguide with permanent gratings (type II gratings) that are stable at high temperatures, e.g. up to 1000° C., and which has a very low insertion loss.

At first glance this FBG may appear to be related to the thermally regenerative grating described in the background section, as a similar sequence of steps is required to create it. However unlike regenerated gratings, no hydrogen loading or specialty fiber is required, nor is there a significant wavelength shift, as was observed with the regenerated gratings. The prior process also requires that the intensity of the UV light used to make the seed grating is below $I_t h$ and the grating is made as strong as possible. In the present case, the intensity is above $I_{th}$ and the exposure is terminated before type I erasure.

The inventors have shown that with continued exposure at intensities above $I_t h$, the structural changes underlying type II index change are related to the well-known self-organized nanostructures (nanograting) as described by Taylor et al. in U.S. Pat. No. 7,033,519. Direct evidence of nano structures in gratings fabricated with sufficient number of accumulated laser pulses to place them in the 203 region of FIG. 2, were imaged with scanning electron microscopy and are shown in FIG. 7. Without wishing to be bound by theory, it is believed that the self-organized nanostructures observed for these exposures beyond the Bragg resonance erasure are predictive of the type II structures obtained by irradiation, at an intensity greater that $I_t h$, of the optical waveguide where irradiation is terminated after formation of a type II grating but prior to the Bragg resonance wavelength erasure.

In some embodiments, the optical waveguide prepared according to the process of the present invention has a scattering loss of 3 dB or less, for example of from 2 dB or less, 1 dB or less, 0.5 dB or less, or 0.1 dB or less.

In some embodiments, the Bragg grating prepared according to the process of the present invention has a reflectivity, at the characteristic wavelength, that is higher than 10%, for example higher than 25%, higher than 50%, higher than 75%, higher than 90%, higher than 95%, higher than 99%, or higher than 99.9%.

In one embodiment, the optical waveguide prepared according to the process of the present invention has a scattering loss of 3.0 dB of less (for example 0.5 dB or less), and the Bragg grating inscribed within the waveguide has a reflectivity at the characteristic wavelength higher than 1% (for example higher than 10%, higher than 50%, or higher than 80%). In another embodiment, the Bragg grating contains self-organized nanostructures.

Electromagnetic Radiation

In one embodiment, the exposure parameters of pulse energy and duration, either Fourier transform limited pulse durations or chirped pulse durations, are set for Type II grating fabrication.

In one embodiment, the electromagnetic radiation has a pulse duration of less than or equal to 5 picoseconds, for example of less than 1 picosecond, of less than 500 femtoseconds, of less than 350 femtoseconds, of less than 100 femtoseconds, or between 50 and 100 femtoseconds.

In one embodiment, the electromagnetic radiation has characteristic wavelength in the wavelength range from 150 nm to 2.0 microns; for example from about 400 nm to about 1.0 microns, or about 800 nm.

While the examples herein utilize femtosecond lasers having infrared wavelength (800 nm), the present invention is not limited to using femtosecond pulse duration lasers at infrared wavelengths. For example, Bernier et al. demonstrated in Optics Express 17 (21), p. 18887 (2009) that Bragg gratings could be written in optical fiber by frequency doubling a high intensity 800 nm infrared femtosecond pulse to produce a 400 nm high intensity pulse that is passed through a phase mask that is optimized for diffraction of 400 nm radiation.

In some embodiments, the intensity of the electromagnetic radiation is selected such that the intensity at the surface of the fiber surface, following passage through the diffractive optical element (which can be, in some embodiments, a phase mask) is at, or great than, the intensity threshold ($I_{th}$) as defined in Opt. Express., vol. 13, pp. 5377-5386, 2005. In one embodiment, optical waveguide comprises a silica fiber, and the intensity of electromagnetic radiation is selected such that the intensity at the surface of the fiber (i.e. $I_{th}$) is $I_{th}=4\times10^{13}$ W/cm$^2$ or greater for a 120 femtosecond pulse.

Duration of Irradiation

As noted above, in some embodiments the optical waveguide is irradiated for at least a number of pulses sufficient to cause a permanent change in an index of refraction within a core of the optical waveguide, i.e. in an amount sufficient to form a type II grating in the core of the optical waveguide. Various methods will be known to those of skill in the art to determine whether type II gratings have been formed. For example, irradiation may be conducted at least for a number of pulses sufficient for a cladding mode resonance to be observed in a transmission spectra through the inscribed optical waveguide. Trial and error methods can also be used—for a particular combination of fiber, laser and phase mask, a set number of pulses can be irradiated and the inscribed fiber then heated sufficiently to remove any type I gratings that may have been formed. If type II gratings are observed after heating, then it is known that that the set number of pulses are sufficient for the formation of type II gratings.

In one embodiment, irradiation of the optical waveguide is continued for a number of pulses sufficient to reach the first maximum point of reflectivity during the irradiation step (between phases A and B in FIG. 2).

As noted above, the irradiating step is terminated prior to erasure of a Bragg resonance engendered by the irradiation. Determining whether the Bragg resonance has been erased can be done by various methods which will be apparent to those of skill in the art. For example, the reflection spectra of the optical waveguide can be monitored during irradiation (e.g. with a Bragg grating interrogator that monitors the strength of the reflected Bragg resonance light), and the irradiation terminated before the Bragg resonance reflection reaches a minimum value. A trial and error approach can be utilized, in which for a particular combination of fiber, laser and mask, the transmission spectra, showing the initial signal growth, signal reduction, Bragg resonance erasure, and subsequent signal regrowth is recorded. Knowing the relationship between the number of pulses and the signal amplitude, the skilled person can determine the number of pulses required to reach Bragg resonance erasure and can thus terminate irradiation prior to this point without monitoring the grating characteristics in real time during irradiation.

In another embodiment, Bragg resonance erasure can be monitored by observing the shift of Bragg resonance wavelength during inscription. As shown in FIG. 2, if reflectivity is monitored as inscription proceeds a slight shift in the reflected resonance may be observed. The Bragg resonance wavelength may shift towards longer wavelengths during region 201 of inscription. However as the Bragg grating reflectivity is disappearing in region 202, the resonance may start to return to its original wavelength but not quite return there. Following the Bragg resonance erasure, the shift towards longer wavelengths may then resume (possibly due, in part, to heating of the fiber). Monitoring the shift in reflected wavelength and determining or predicting a minimum therein may therefore be used, in one embodiment, to determine or predict Bragg resonance erasure and thus determine when to terminate irradiation.

Optical Waveguide

In some embodiments, the optical waveguide according to the present invention is a fiber. Any fiber in which a type II grating can be inscribed by way of an ultrashort pulse duration laser having a pulse duration of less than or equal to 5 picoseconds and a characteristic wavelength of from 150 nm to 2.0 microns can be used.

In some embodiments, the fiber is silica, borosilicate, phosphate, fluoride (ZBLAN), chalcogenide, bismuth oxide, photonic crystal fiber. Other fibers known in the art may also be used.

In some embodiments, the fiber may be doped with one or more elements. Suitable dopants may include, for example, germanium, fluorine, hydrogen, erbium, ytterbium, titanium, thulium, holmium, europium, and phosphate. The concentration of any particular dopant can vary, and will be dictated by the particular application.

As noted above in the background section, in some prior art processes doping of fibers was necessary to achieve formation of the gratings. In embodiments of the present invention, such dopants are not required. Thus, in one embodiment of the present invention the fiber has a core that is non-UV absorbing, e.g. the fiber has a core that is free of germanium, or that has a concentration of germanium that is insufficient to permit inscription of gratings with a UV laser source, e.g. a germanium concentration of less than 3%. In another embodiment, the fiber is not loaded with hydrogen, or it contains a concentration of hydrogen which is insufficient to permit the formation of type II gratings in the fiber for example by a thermally regenerated gratings described in the background section.

Heating of the Fiber

After irradiation of the waveguide has terminated, the optical waveguide is heated to a temperature and for a duration sufficient to substantially remove a non-permanent grating formed in the optical waveguide by the irradiating step (e.g. to remove the type I gratings formed during irradiation).

In one embodiment, heating is carried out at one or multiple temperatures between 500° C. and a temperature just below the glass transition temperature of the fiber forming the optical waveguide. For example, the heating may be carried out at one or multiple temperatures between 500° C. and 1000° C.

Heating of the waveguide can be achieved by any method and apparatus known in the art. In one embodiment, the inscribed waveguide is moved to a furnace which is already at a desired temperature, or the inscribed waveguide is moved to a furnace the temperature of which is then increased or decreased to a desired temperature. Heating of the waveguide may also include subjecting the inscribed waveguide to ranges of temperatures overtime, optionally according to a preset schedule.

In further embodiments, heating of the inscribed waveguide may be realized using a mid-infrared laser beam, e.g. from a $CO_2$ laser. In yet another embodiment, heating may be realized by using a technique of coupling high intensities of optical energy into the optical fiber using approaches described by Chen et al. in the paper entitled "*Self-heated fiber Bragg grating sensors*," Appl. Phys. Lett. 86, 143502 (2005).

In some embodiments, the heating step may be carried out under flow of an inert gas (e.g. nitrogen or helium) to prevent ingress of oxygen into the heated fiber.

In some embodiments, writing of the Bragg grating and the thermal post-treatment are carried out in separate apparatus. In further embodiments, a thermal annealing architecture is placed proximate to the writing set up, and there is provided an automated manufacturing arrangement, wherein the exposed (i.e. inscribed) fiber is translated from the writing set up to a microfurnace, wherein localized heating of the inscribed region is carried out. Localized heating may also be achieved by an apparatus other than a microfurnace, such as the mid-infrared laser beam or coupling of high intensities of optical energy into the optical fiber, as described above. The automated process may also be arranged such that the heating step is carried out under flow of an inert gas, as described above.

EXAMPLES

The following examples are provided to illustrate the invention. It will be understood, however, that the specific details given in each example have been selected for purpose of illustration and are not to be construed as limiting the scope of the invention. Generally, the experiments were conducted under similar conditions unless noted.

Example 1—Formation of Type II Bragg Grating with Low Insertion Loss

A regeneratively amplified Ti:sapphire femtosecond laser system with 80 fs pulse duration and operated at 800 nm wavelength was used as a laser source. The laser was operated at 5 Hz and 1 mJ laser pulse energy and the pulse chirped to 500 fs. The beam was focused through a 19 mm cylindrical lens and a phase mask with 1.065 µm pitch into the core of a standard Ge-doped core silica telecom fiber (Corning SMF-28; ~4% Ge doping level core in a pure silica fiber substrate). The fiber was placed on a jig at 1 mm distance behind the phase mask ensuring pure two beam interference and a 532.5 nm grating pitch within the fiber. This periodicity in the fiber produced a fundamental Bragg resonance within the fiber. The laser beam was swept vertically across the fiber core at ~3 µm/s by dithering the focusing lens. During the exposure, the evolution of the grating reflectivity was continuously monitored in both transmission and reflection spectra. The exposure was terminated when the grating was in the stage 202 (as shown in FIG. 2) of the grating structure evolution (i.e. irradiation was terminated prior to Bragg resonance wavelength erasure). After exposure, the fiber was annealed in a Lindberg tube furnace (isochronal annealing-temperature increments of 50° C. increments, from 500° C. to 1000° C., one hour duration at each temperature, then held at 1000° C. for 5 hours).

Reflection spectra were taken using a commercially available FBG interrogator system (Micron Optics). Insertion loss (scattering loss) measurements were performed using the 'cut-back' method where comparative transmission spectra through the fiber were taken first with the grating and then with the FBG removed from the fiber by cleaving. Alternatively, insertion loss may also be measured by way of in situ monitoring of the broadband insertion loss in transmission—using the initial spectrum absent a grating as the initial zeroing reference measurement; scattering loss with grating exposure will appear as a reduction of signal across the entire spectrum.

Example 2—Thermal Treatment

Figure 3:
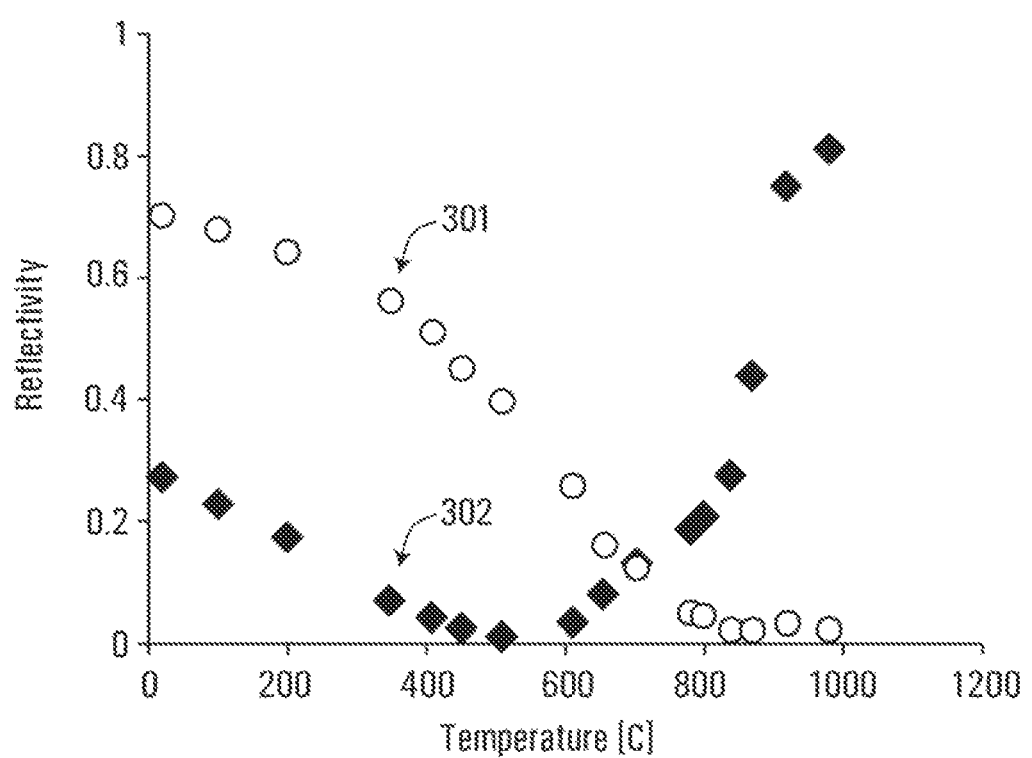
FIG. 3 compares the change in reflectivity for two types of gratings during a post heating treatment.

To test the effect of thermal treatment, two gratings were inscribed, side by side, on the same strand of fiber. First, a grating was written using the conditions detailed in Example 1, terminating the exposure when the grating was in the stage 202 of the grating structure evolution (i.e. irradiation terminated prior to Bragg resonance wavelength erasure). This grating is identified as (302) in FIG. 3. A second grating was written using grating inscription parameters needed to produce a Type I grating (laser pulse intensities below $I_{th}$). The second grating, whose annealing behavior is known, served as a reference to the annealing behavior of the first grating. The fiber was then inserted in the furnace and the temperature incremented by roughly 100° C. every hour. As shown in FIG. 3, the Type I grating (301) annealed as expected, losing half of its reflectivity around 500° C. and decreasing below the 2% reflectivity at 1000° C. The B grating (302) however, after losing much of its reflectivity at 500° C., rebounded at 600° C. and grew rapidly to 80% reflectivity at 1000° C. Without wishing to be bound by theory, it is believed that as the type I gratings are being erased, we reach of a point of cancelation between the remaining type I gratings and the type II gratings. This is then followed by complete erasure of the type I gratings, allowing the reflectivity caused by the type II gratings to be seen.

After a few hours at 1000° C. the grating reflectivity stabilized at 66% and remained there during long term annealing at 1000° C. for about 100 hours. After annealing, the Bragg resonance at room temperature returned to within 20 µm of its initial value. The insertion loss of the 302 grating was measured to be less than 0.1 dB.

Example 3—Fabrication of Grating Array with Irradiation Beyond Bragg Resonance Erasure Applying the method described in Mihailov, S. J., Grobnic, D., Smelser, C. W., Lu, P., Walker, R. B. and Ding, H., "Bragg grating inscription in various optical fibers with femtosecond infrared lasers and a phase mask," Opt. Mater. Express 1(4), 754-765 (2011), arrays were fabricated with up to 24 Type-II fs-IR FBGs, using phase masks having uniform periods between 1.043 µm and 1.097 µm. The gratings were written through a 19 mm focal-length cylindrical lens, using 800 nm, 350 fs, 0.85 mJ regeneratively amplified pulses, at a repetition rate of 3 Hz. The fiber surface was placed 200 µm from the phase mask and the beam was swept ±10 µm over its cross section with a frequency of 0.2 Hz. As a result of the phase mask to fiber proximity, the written grating periods are the same as the corresponding phase masks, resulting in second order Bragg resonances. The strip and recoat method was employed, and except where noted, polyimide coated standard germanium-doped single mode fiber was used. Gratings were annealed in-situ during normal combustor operations.

While inscribing these Type II gratings, the three phases of grating growth described above were observed. During the first phase, a typical Type I reflection spectrum was seen. Following strong growth, subsequent laser pulses resulted in an apparent erasure of the central reflection peak. Ultimately in the third phase, the central reflection peak was re-grown, indicating that a strong Type II grating was induced.

Characterization of the array produced by irradiation into the third phase of growth showed that the Type II gratings produced had a high scattering loss. In a multiplexed system, such losses can limit the number of deployable sensors by obscuring FBGs downstream. Thus, even when the losses appear acceptable following fabrication, spectral growth resulting from the annealing of strong Type II structures can make these losses intolerable over time. As observed in FIG. 4, strong exposures produce loss, evident by the slope of reflection peaks for 24 equally strong Type II fs-IR FBGs.

Example 4—Fabrication of Grating Array with Termination of Irradiation Prior to Bragg Resonance Erasure To reduce the scattering losses experienced by arrays prepared by irradiation into the regrowth phase (such as described in Example 3), a separate array was prepared using the same method, except that the inscription step was halted during the erasure phase of spectral growth (i.e. prior to Bragg resonance erasure). Room temperature reflection spectra of this array are shown in FIGS. 5A (pre-annealing) and 5B (post annealing). As can be seen from these Figures, this method provides an array which does not suffer from the high scattering loses observed for the array prepared by irradiation into the regrowth phase. It can also be seen that the thermal treatment provides for an overall increase in observed reflection as the type I gratings are erased.

Example 5—Temperature Cycling of Array

To characterize the performance of the array prepared in Example 3 at temperatures up to about 1100° C., nine different FBGs were each subjected to three thermal cycles in a tube furnace. Their wavelength shift versus temperature was then plotted and equations fit to the data. The sampling of gratings used incorporated several Bragg wavelengths, ranging from 1512 nm to 1551 nm. Subjecting each device to three thermal cycles revealed that each provided good repeatability from cycle to cycle.

FIG. 6A plots the average fit for each device as well as the overall average fit. Although a 6th order equation is provided, equations as low as third order also appear to fit reasonably well. Unlike the comparative results shown in FIG. 6B, which were published previously by Walker, R. B. et al. "Entrained-flow gasifier and fluidized-bed combustor temperature monitoring using arrays of fs-IR written fiber Bragg gratings," Proc. SPIE 9634, 96343X, 1-4 (2015), there appears to be much less variation from grating to grating. Thus, the present method has been shown to eliminate some randomly occurring defects manifested during FBG inscription.

Example 6—SEM Observation of Gratings

Type II gratings were prepared according to the general procedure described in Mihailov, et al. (2011) (supra), and SEM images of the obtained gratings are shown in FIGS. 7(a)-7(e). FIGS. 7(a) and (b) were produced using chirped 150 fs pulses, a 19 mm focal length cylindrical lens and a 3.21 μm pitch mask. The pulse energy was 900 μJ. Figures (c)-(e) were produced with a 8 mm focal length acylindrical lens and a 1.07 μm pitch mask. The pulse energy was 150 μJ and the mask-to-fiber distance was ~1 mm, similarly to (a) and (b). Figures (c) and (d) correspond to transform-limited 80 fs pulses, whereas (e) corresponds to chirped 400 fs pulses. In all the Figures (a)-(e), the total number of absorbed pulses was about 3000.

The SEM observations directly correlate the thermal stability of a phase mask written grating with the formation of the form birefringence or nanostructures described by Taylor et al. in U.S. Pat. No. 7,033,519. These are substantially different than the point by point technique for writing gratings that result in material disruption and very high scattering loss.

Additional gratings were prepared according to the processes described herein, except that irradiation was terminated during the initial stage of growth (stage 201 as shown in FIG. 2). SEM images of such gratings (not present) did not show the nanostructure pattern.

All publications, patents and patent applications cited in this specification are herein incorporated by reference as if each individual publication, patent or patent application were specifically and individually indicated to be incorporated by reference. The citation of any publication is for its disclosure prior to the filing date and should not be construed as an admission that the present invention is not entitled to antedate such publication by virtue of prior invention.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

It must be noted that as used in this specification and the appended claims, the singular forms "a", "an", and "the" include plural reference unless the context clearly dictates otherwise. Unless defined otherwise all technical and scientific terms used herein have the same meaning as commonly understood to one of ordinary skill in the art to which this invention belongs.

The invention claimed is:

1. An optical waveguide with an inscribed Bragg grating prepared according to a method comprising the steps of:
   providing the optical waveguide;
   providing electromagnetic radiation from an ultrashort pulse duration laser, wherein the electromagnetic radiation has a pulse duration of less than or equal to 5 picoseconds, and wherein the wavelength of the electromagnetic radiation has a characteristic wavelength in the wavelength range from 150 nm to 2.0 microns;
   irradiating the optical waveguide with the electromagnetic radiation to form a Bragg grating, the electromagnetic radiation incident on the optical waveguide being sufficiently intense to cause a permanent Type II change of the index of refraction within a core of the optical waveguide when exposed to laser pulses, wherein the irradiating step is carried out for at least a number of pulses sufficient to form first a non-permanent Bragg grating having a Type I characteristic spectrum with low cladding mode resonance and low scattering loss within the core of the optical waveguide, and wherein the irradiating step is terminated prior to erasure of a Bragg resonance associated with the first non-permanent Bragg grating, and prior to the formation of permanent high scattering loss Type II change of the index of refraction due to the irradiation; and heating the optical waveguide to a temperature and for a duration sufficient to substantially remove the non-permanent Bragg grating formed in the optical waveguide by the irradiating step until the formation as a result of heating the optical waveguide of a newly formed Bragg grating having a permanent low scattering loss Type II change of the index of refraction.

2. The optical waveguide of claim 1, wherein the newly formed Bragg grating has a scattering loss of less than 0.5 dB.

3. The optical waveguide of claim 1, wherein the temperature is greater than 500° C.

4. The optical waveguide of claim 1, wherein the low scattering loss is 3 dB or less.

5. A method of producing an optical waveguide with an inscribed Bragg grating comprising the steps of:

providing the optical waveguide;

providing electromagnetic radiation from an ultrashort pulse duration laser, wherein the electromagnetic radiation has a pulse duration of less than or equal to 5 picoseconds, and wherein the wavelength of the electromagnetic radiation has a characteristic wavelength in the wavelength range from 150 nm to 2.0 microns;

irradiating the optical waveguide with the electromagnetic radiation to form a Bragg grating, the electromagnetic radiation incident on the optical waveguide being sufficiently intense to cause a permanent Type II change of the index of refraction within a core of the optical waveguide when exposed to laser pulses, wherein the irradiating step is carried out for at least a number of pulses sufficient to form first a non-permanent Bragg grating having a Type I characteristic spectrum with low cladding mode resonance and low scattering loss within the core of the optical waveguide, and wherein the irradiating step is terminated prior to erasure of a Bragg resonance associated with the first non-permanent Bragg grating, and prior to the formation of permanent high scattering loss Type II change of the index of refraction due to the irradiation; and heating the optical waveguide to a temperature and for a duration sufficient to substantially remove the nonpermanent Bragg grating formed in the optical waveguide by the irradiating step until the formation as a result of heating the optical waveguide of a newly formed Bragg grating having a permanent low scattering loss Type II change of the index of refraction.

6. The method of claim 5, wherein the newly formed Bragg grating has a scattering loss of less than 0.5 dB.

7. The method of claim 5, wherein the temperature is greater than 500° C.

8. The method of claim 5, wherein the low scattering loss is 3 dB or less.

* * * * *